Nov. 18, 1941.    D. B. BAKER    2,262,877
VEHICLE
Filed Jan. 26, 1940    2 Sheets—Sheet 1

INVENTOR
D. B. BAKER
BY Paul O Pippel
ATTY.

Nov. 18, 1941.    D. B. BAKER    2,262,877
VEHICLE
Filed Jan. 26, 1940    2 Sheets-Sheet 2

INVENTOR
D. B. BAKER
By Paul O Pippel
ATTY.

Patented Nov. 18, 1941

2,262,877

UNITED STATES PATENT OFFICE 2,262,877

VEHICLE

David B. Baker, Riverside, Ill., assignor to International Harvester Company, a corporation of New Jersey Application January 26, 1940, Serial No. 315,817

3 Claims. (Cl. 180—1)

This invention relates to a vehicle, and more particularly to an improved vehicle construction consisting of the arrangement of certain auxiliary devices utilized in the vehicle.

The invention specifically contemplates improvements in the arrangement of indicating devices on the hood structure of a vehicle, the arrangement permitting the devices to be located within the line of vision of the operator. The improved arrangement is especially adaptable to agricultural tractors and consists in contributing to the generally increased vision desirable to the operators of such tractors.

As is well known to those skilled in the art, an agricultural tractor of the prominent type comprises generally a longitudinal narrow body including a forwardly disposed engine and a rearwardly disposed operator's station. A fuel tank is located just forwardly of the operator's station and has its rear end and side portions so shaped as to preclude angular projections into the line of the operator's vision. It has been the usual practice to locate indicating devices, such as fuel and temperature gauges, where they are immediately at the rear of the fuel tank in the position usually occupied by an instrument panel. The re-locating of the devices according to the present invention is desirable for the purpose of removing such devices from the path of the operator's vision downwardly and at the side of the tractor.

The principal object of the present invention, then, is to provide an improved mounting for indicating devices wherein such devices are readily exposed to the view of the operator, yet do not interfere with his vision during the ordinary operation of the tractor.

An important object is to locate the devices at a point forwardly of the operator and enclosed by the hood structure for the tractor power plant, the hood structure including openings exposing the indicia-bearing faces of the devices to the view of the operator.

Another object is to provide a supporting structure for these devices below the hood structure.

Another object is to provide a hood structure having tunnel portions enclosing the devices and tapering toward the front of the hood, whereby the appearance of the vehicle is enhanced and whereby there is eliminated the possibility of the devices catching low hanging branches of trees or the like.

Another object is to provide a forward vehicle construction wherein the power plant and fuel tank are longitudinally spaced to provide a space wherein is mounted a supporting bracket carrying the indicating devices, an air cleaner, and an auxiliary fuel tank.

Another object is to provide the hood structure with a tunnel portion accommodating and enclosing a portion of the longitudinally extending steering rod disposed above the power plant.

Another object is to provide means on the aforesaid support for journaling the steering rod.

Briefly, and specifically, these and other important objects are achieved in one preferred form of the invention by the provision in an agricultural tractor, of a hood structure enclosing the tractor power plant, wherein the tractor includes a fuel tank rearwardly of the power plant, and the upper contours of the fuel tank and hood structure are generally coextensive. The hood includes a pair of transversely spaced tunnel portions tapering toward the front of the hood and enclosing a pair of indicating devices exposed to the view of the tractor operator through openings formed respectively in the tunnels. The hood further includes another tunnel portion extending substantially the length of the hood and tapering toward the front end for enclosing the forward portion of a longitudinally extending steering rod disposed above the power plant and carrying a steering wheel at its rear end within proximity to the operator's station. The supporting structure located beneath the hood carries the indicating devices, journals the steering rod, and carries a pair of auxiliaries, such as an air cleaner and an auxiliary fuel tank in laterally spaced relation in the space provided between the forward end of the fuel tank and the rear end of the power plant.

A more complete understanding of these and other desirable features of the invention may be had from the following detailed description taken in conjunction with the accompanying sheets of drawings, in which.

Figure 1:
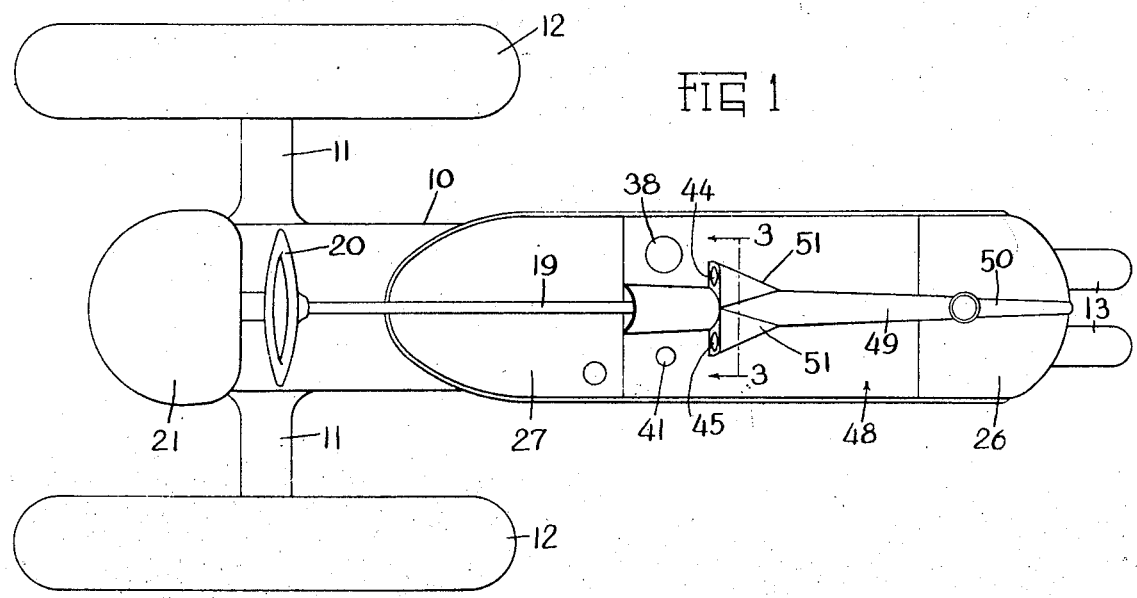
Figure 1 is a general plan view of a tractor embodying the improved construction.

The vehicle chosen for the purpose of illustration is an agricultural tractor comprising a generally narrow longitudinal body 10 provided at its rear end with oppositely extending axle housings 11 carrying drive wheels 12. The front end of the tractor is carried by a pair of closely spaced front wheels 13 comprising a front wheel assembly including a vertical standard 14 having a vertical steering shaft, not shown, journaled in a vertically extending supporting structure 15 carrying at its top a steering gear housing 16. The housing 16 contains suitable gearing, not shown, to which is operatively connected a steering rod 17 which extends longitudinally rearwardly to a point where it is connected by a universal joint 18 to a second steering rod 19. The rod portion 19 carries at its rear end a steering wheel 20 located in proximity to an operator's station 21 rearwardly disposed on the body 10.

The body 10 includes a forwardly disposed power plant 22 including a crankcase portion 23 and a cylinder block portion 24. A radiator 25 of conventional type is disposed ahead of the engine 22 and rearwardly of the vertical support 15. The support 15, the radiator 25, the steering gear housing 16 and the forward portion of the power plant or engine 22 are enclosed by a forward grille structure 26 preferably formed of sheet metal and appropriately mounted at the front end of the body 10.

A fuel tank 27, having rearwardly sloping sides, is disposed forwardly of the operator's station 21 and rearwardly of the end of the power plant 22. The disposition of the fuel tank with respect to the power plant is such that a space 28 is provided between the front end of the former and the rear end of the latter. This space is disposed generally above an upstanding housing portion 29 provided on the body 10 intermediate the ends thereof. The rear end of the fuel tank is appropriately supported on a comparatively narrow, light weight bracket 30. The forward end of the tank is carried at the rear end of a support 31 carried by a bracket 32 secured to the aforesaid housing portion 29. The brackets 31 and 32 have secured thereto an upstanding support 33 extending vertically at the rear of the power plant 22 substantially mid-way between the sides of the body 10. This support 33 includes a pair of laterally spaced rearwardly extending supporting flanges 34 and 35. The supporting flange 34 carries, through the medium of a bracket 36, an air cleaner 37, which may be of any conventional type. The air cleaner is provided with an upstanding intake 38. The supporting flange 35 carries, by means of a bracket 39, an auxiliary fuel tank 40 including a filler neck 41. The upper portion of the support 33 carries at its center a sleeve forming a bearing 42 journaling the steering rod 17.

It will be readily seen from an examination of the drawings that the upper portion of the support 33 extends above the upper contour of the fuel tank 27. The support at this point is provided with a pair of attaching brackets 43, each bracket extending upwardly and laterally and being disposed at one side of the steering rod 17. One bracket 43 carries an indicating device in the form of an oil gauge 44 and the other carries an indicating device in the form of a temperature gauge 45. The oil gauge is connected by an oil line 46 with the crankcase portion 23 of the engine in the usual manner. The temperature gauge is suitably connected by a lead 47 with the block 24 of the engine. Each gauge includes an indicia-bearing face exposed to view from the operator's station 21, the gauges being disposed above the upper contour of the fuel tank 27.

Figure 2:
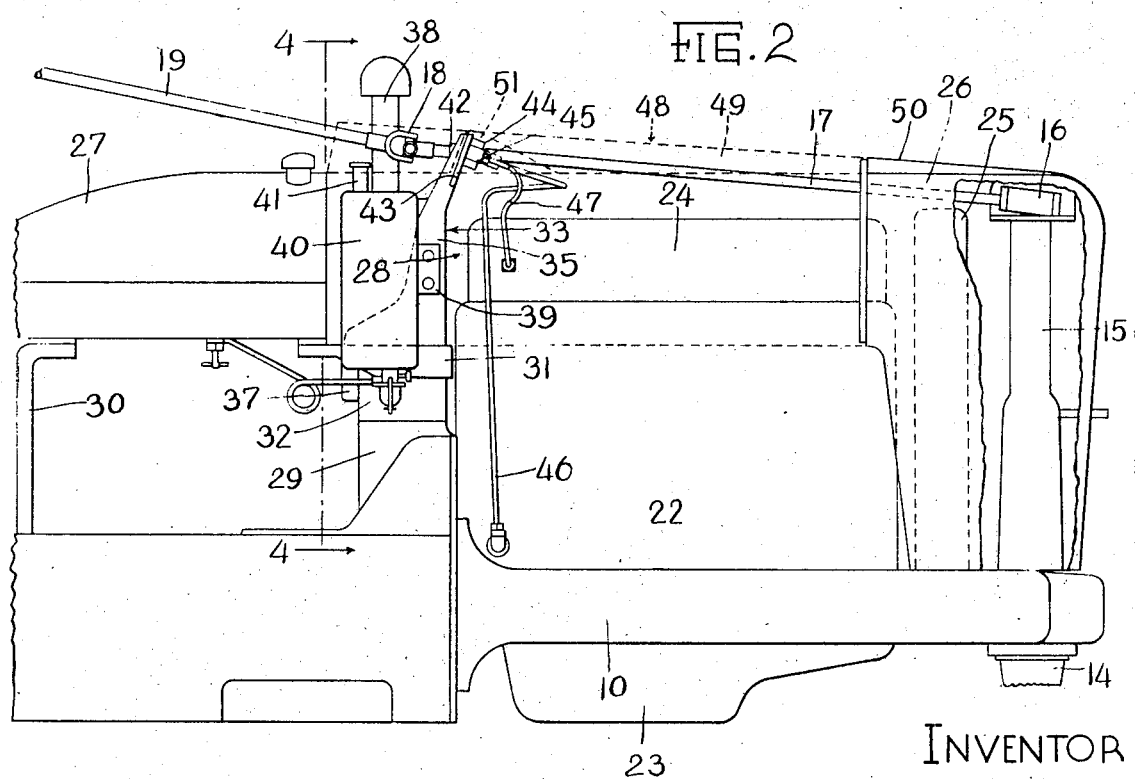
Figure 2 is an enlarged side elevational view of the forward portion of the tractor, showing the hood in broken lines.
Figure 3:
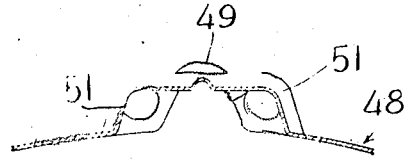
Figure 3 is an enlarged transverse sectional view of the hood taken substantially on the line 3—3 of Figure 1.
Figure 4:
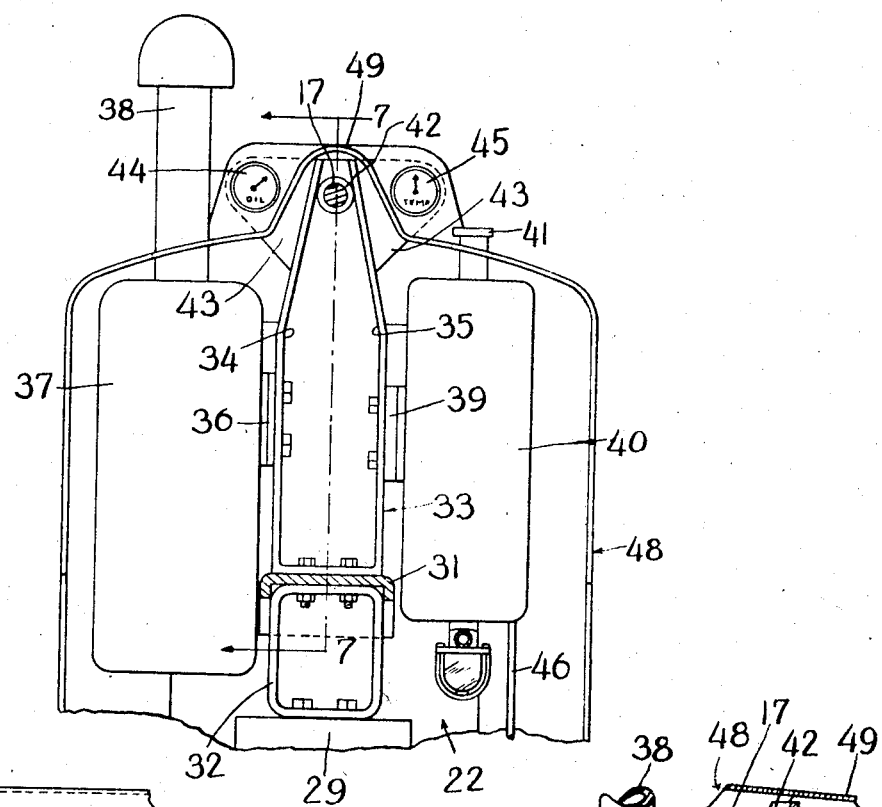
Figure 4 is a transverse sectional view taken substantially on the line 4—4 of Figure 2.
Figure 5:
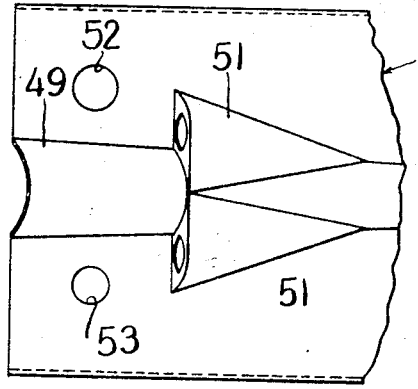
Figure 5 is an enlarged plan view of a portion of the hood structure showing the tunnel portions therein.
Figure 6:
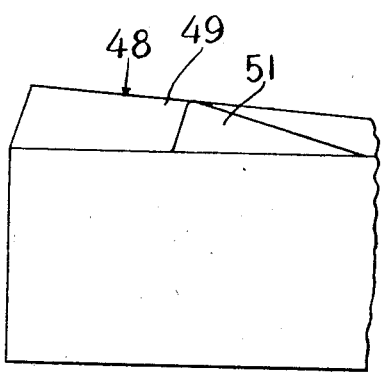
Figure 6 is a side view of the same.
Figure 7:
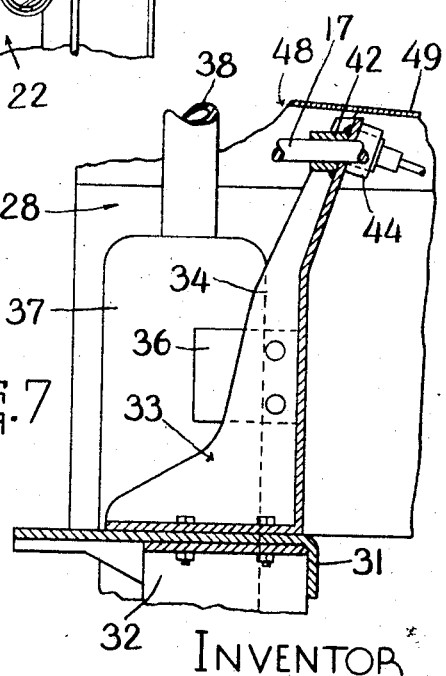
Figure 7 is a longitudinal sectional view taken on the line 7—7 of Figure 4.

A hood structure 48 is disposed above the power plant 22 and extends longitudinally between the rear end of the grille structure 26 and the forward end of the fuel tank 27. The upper portion of the hood includes a tunnel 49 extending substantially the entire length thereof and tapering toward the front end of the tractor body. The grille structure includes a longitudinally extending rib 50 joining the tunnel 49 to form substantially a continuation thereof. The tunnel 49 encloses the steering rod portion 17 as best shown in Figures 1, 2 and 4. The hood is further enlarged adjacent its rear end portion to provide a pair of laterally spaced tunnels 51, each of which tapers toward the front end of the hood. These tunnels respectively enclose the indicating devices 44 and 45, and each is open at its rear to expose the indicia-bearing faces of the devices to the view of the operator from the operator's station 21. The tunnels 49 and 51 are preferably formed integral with the hood structure, as best shown in Figure 3. The hood is provided with an opening 52 at the left-hand side thereof for accommodating the intake pipe 38 of the air cleaner 37, and with a second opening 53 for accommodating the filler neck 41 of the auxiliary fuel tank 40.

The improved arrangement provides for conveniently grouping the various auxiliaries described in the space provided between the forward end of the fuel tank 27 and the rearward end of the power plant 22. The indicating devices are further conveniently grouped centrally of the tractor and above the general contour of the hood 48 and the fuel tank 27. The devices thus occupy a position readily accessible to be read by the operator, and yet out of the path of ordinary vision of the operator downwardly at opposite sides of the tractor body. In short, the operator may read the devices as an incident to his straight-ahead view. The tapering of the tunnel portions 49 and 52 contributes materially to the appearance of the tractor and at the same time properly encloses the indicating devices and the steering rod 17. The enclosing of these parts eliminates the possibility of these parts becoming entangled with low hanging branches of trees or the like that may occur in localities wherein the tractor is operated.

From the foregoing description it will be seen that an improved construction has been provided for attaining the objects enumerated above. Other objects and features will be apparent to those skilled in the art. It will be understood, of course, that only a preferred construction has been illustrated and described, and that numerous modifications may be made therein without departing from the spirit and scope of the invention as defined in the appended claims.

What is claimed is:

1. In a vehicle having a body supported on front and rear wheels and including a rearwardly disposed seat, a forwardly disposed power plant, and an intermediately disposed fuel tank, and steering means for the front wheels including a steering rod extending longitudinally forwardly from the operator's station above the fuel tank and power plant, the combination with the body of a support for the fuel tank arranged between the forward end of the tank and the rear end of the power plant, said support including a journal for the steering rod, an indicating device carried by the support and disposed above the upper portion of the fuel tank, and a hood arranged over the power plant and having an upper portion disposed at a height generally coincident with the upper portion of the fuel tank, said hood including a portion substantially enclosing the proximate part of the steering rod and a portion substantially enclosing the indicating device, said second portion being open at its rear to expose the device to view from the operator's station.

2. In a vehicle including a body, the combination of a forwardly disposed engine, a fuel tank disposed in longitudinally spaced relation at the rear of the power plant, a support carried by the body and extending in the space between the fuel tank and the power plant and disposed generally on the longitudinal center-line of the vehicle, said support carrying the forward end of the fuel tank, an air-cleaner disposed in said space at one side of the support and secured thereto, an auxiliary fuel tank disposed in said space at the opposite side of the support and secured thereto, and a hood structure arranged over the power plant and having its rear portion associated with the first fuel tank and substantially enclosing the space at its top.

3. In a vehicle having a body including a rearwardly disposed operator's station, a forwardly disposed power plant, and a steering rod extending longitudinally of the body above the power plant, the combination with the body of a pair of laterally spaced indicating devices carried by the body and disposed above the power plant respectively at opposite sides of the steering rod, and a substantially long hood structure arranged over the power plant and including an integral upper tunnel portion substantially enclosing a portion of the steering rod and extending substantially the length of the hood and tapering toward the front of the body, said hood further including a pair of integral, comparatively shorter longitudinal tunnel portions respectively substantially enclosing the indicating devices and tapering toward the front of the body, each of said shorter tunnels including an opening exposing a device to view from the operator's station.

DAVID B. BAKER.